(12) United States Patent
Kaya (10) Patent No.: US 12,151,437 B2
(45) Date of Patent: Nov. 26, 2024

(54) METHOD FOR THE ADDITIVE MANUFACTURING OF A COMPONENT

(71) Applicant: L'Air Liquide, Société Anonyme pour l'Etude et l'Exploitation des Procédés Georges Claude, Paris (FR)

(72) Inventor: Cerkez Kaya, Krefeld (DE)

(73) Assignee: L'Air Liquide, Societe Anonyme Pour l'Etude et l'Exploitation des Procedes, Georges Claude Paris (FR)

( * ) Notice: Subject to any disclaimer, the term of this patent is extended or adjusted under 35 U.S.C. 154(b) by 536 days.

(21) Appl. No.: 17/285,847

(22) PCT Filed: Oct. 14, 2019

(86) PCT No.: PCT/EP2019/077747
§ 371 (c)(1),
(2) Date: Apr. 15, 2021

(87) PCT Pub. No.: WO2020/078886
PCT Pub. Date: Apr. 23, 2020

(65) Prior Publication Data
US 2021/0379667 A1    Dec. 9, 2021

(30) Foreign Application Priority Data
Oct. 16, 2018   (DE) .......................... 102018125605.1

(51) Int. Cl.
*B29C 64/371* (2017.01)
*B22F 10/20* (2021.01)
(Continued)

(52) U.S. Cl.
CPC ............ *B29C 64/371* (2017.08); *B22F 10/20* (2021.01); *B22F 10/322* (2021.01); *B22F 12/20* (2021.01);
(Continued)

(58) Field of Classification Search
CPC ........ B22F 10/20; B22F 10/322; B22F 12/20; B22F 12/70; B22F 2203/11;
(Continued)

(56) References Cited

U.S. PATENT DOCUMENTS

2015/0041025 A1    2/2015   Wescott et al.
2015/0064047 A1    3/2015   Hyde et al.
(Continued)

FOREIGN PATENT DOCUMENTS

CN    102 162 096    8/2011
DE    197 46 504     4/1999
(Continued)

OTHER PUBLICATIONS

International Search Report and Written Opinion for corresponding PCT/EP2019/077747, Jan. 22, 2020.
(Continued)

*Primary Examiner* — Jenny R Wu
(74) *Attorney, Agent, or Firm* — Elwood L. Haynes (57) ABSTRACT

A method for the additive manufacturing of a component, in which method the component is configured layer-by-layer from a base material which is solidified at least in regions in each layer, the method includes introducing at least one cooling gas flow for cooling at least the region to be solidified by way of at least one cooling medium nozzle into a carrier gas flow so as to form a cooling gas flow, wherein the cooling medium is present so as to be liquid and/or gaseous, wherein the cooling gas flow is guided through a de Laval nozzle, wherein the cooling medium flow is introduced such that the outflow of the cooling medium flow into the carrier gas flow takes place within or downstream of the de Laval nozzle, and the cooling gas flow is directed onto the component.

11 Claims, 4 Drawing Sheets

(51) Int. Cl.
*B22F 10/322* (2021.01)
*B22F 12/20* (2021.01)
*B22F 12/70* (2021.01)
*B29C 64/364* (2017.01)
*B29C 64/393* (2017.01)
*B33Y 10/00* (2015.01)
*B33Y 30/00* (2015.01)
*B33Y 50/02* (2015.01)

(52) U.S. Cl.
CPC ............ *B22F 12/70* (2021.01); *B29C 64/364* (2017.08); *B29C 64/393* (2017.08); *B33Y 10/00* (2014.12); *B33Y 30/00* (2014.12); *B33Y 50/02* (2014.12); *B22F 2203/11* (2013.01)

(58) Field of Classification Search
CPC .. B23K 15/0086; B23K 26/14; B23K 26/144; B23K 26/342; B23K 37/003; B23K 9/04; B33Y 30/00; B33Y 10/00; B33Y 40/00; B33Y 50/02; B29C 64/194; B29C 64/364; B29C 64/371; B29C 64/393; Y02P 10/25
See application file for complete search history.

(56) References Cited

U.S. PATENT DOCUMENTS

| | | |
|---|---|---|
| 2015/0246481 A1 | 9/2015 | Schlick et al. |
| 2017/0182556 A1 | 6/2017 | Ramaswamy et al. |
| 2019/0061061 A1 | 2/2019 | Fischer et al. |

FOREIGN PATENT DOCUMENTS

| | | | |
|---|---|---|---|
| DE | 102014203711 | 9/2015 | |
| DE | 10 2015 117238 | 4/2017 | |
| DE | 112015003337 | 5/2017 | |
| DK | 2574408 | 4/2013 | |
| EP | 2 574 408 | 4/2013 | |
| EP | 2574408 A1 * | 4/2013 | .......... B05B 7/1606 |
| EP | 2 705 942 | 3/2014 | |

OTHER PUBLICATIONS

DAVIS (editor), Selected Applications as published in Handbook of Thermal Spray Technology, ASM International and the Thermal Spray Society, 2004, pp. 175-213.

Li, et al., "Solid-state additive manufacturing and repairing by cold spraying: A review," J. Mater. Sci. Technol. (2017), http://dx.doi.org/10.1016/j.jmst.2017.09.015, 18 pgs.

Lee, et al., "Chapter 8: Cold Spray Applications in the Automotive Industry," High Pressure Cold Spray - Principles and Applications, AMS International, 2016, 18 pgs.

Murtaza, et al., "A Novel Manufacturing Route for Automobile Parts through Two-Wire-Arc Thermal Spray Process," Materials and Manufacturing Processes, 31: 1424-1462, 2016.

Sova, et al., "Potential of cold gas dynamic spray as additive manufacturing technology," Int J Adv Manuf Technol (2013) 69: 2269-2278.

* cited by examiner

METHOD FOR THE ADDITIVE MANUFACTURING OF A COMPONENT

CROSS REFERENCE TO RELATED APPLICATIONS

This application is a 371 of International Application No. PCT/EP2019/077747, filed Oct. 14, 2019, which claims priority to German Patent Application No. DE 10 2018 125606.1, filed Oct. 16, 2018, the entire contents of which are incorporated herein by reference.

BACKGROUND

The subject matter of the present invention is a method for the additive manufacturing of a component, wherein the component is configured layer-by-layer from a base material which in each layer at least in regions is molten and subsequently set, wherein a cooling gas flow is directed at least onto the regions to be solidified.

Additive manufacturing methods, also referred to as 3D printing methods, such as in particular selective laser melting, selective laser sintering, stereolithography, and similar, are manufacturing methods and understood to be methods in which a three-dimensional component is produced from shapeless or shape-neutral materials by means of chemical and/or physical processes, wherein the construction of the component usually takes place layer-by-layer. A construction material per se herein is usually rendered liquid or melted at least in regions, respectively, so as to set in order for the component to be formed, or a binder material which, for example, solidifies pulverulent material is applied. Temporal limits are created on account of the required solidification, since the previously applied material has to be solidified prior to the next application of material. Furthermore, there are situations in which potential edges of the component are defined only to a limited degree on account of the time required for solidifying the material and the potentially still remaining viscosity of the material.

Proceeding therefrom, the present invention is based on the object of at least partially overcoming the disadvantages known from the prior art.

Said objects are achieved by the independent claim. Dependent claims are directed toward advantageous refinements. It is to be pointed out that the features listed individually in the dependent patent claims can be mutually combined in any technologically meaningful way and define further design embodiments of the invention. Moreover, the features stated in the patent claims are discussed and explained in more detail in the description, wherein further preferred design embodiments of the invention will be illustrated.

SUMMARY

The method according to the invention for the additive manufacturing of a component, in which method the component is configured, that is to say formed, layer-by-layer from a base material which in each layer at least in regions is solidified, that is to say a base material which is at least partially solidified in each layer, is distinguished in that a cooling gas flow for cooling at least the region to be solidified by way of a cooling medium nozzle is introduced into a carrier gas flow so as to form a cooling gas flow, wherein the cooling medium is present so as to be liquid and/or gaseous, wherein the cooling gas flow is guided through a de Laval nozzle, wherein the cooling medium flow is introduced such that the outflow of the cooling medium flow into the carrier gas flow takes place within or downstream of the de Laval nozzle, and the cooling gas flow is directed onto the component.

In the case of the method according to the invention it is preferable for the base material per se to be solidified, thus for the base material to be at least partially molten and then solidified, for example, or for the base material to be applied when liquid and then solidified. It is furthermore preferable for the base material to be solidified by at least one additive, for example a binding agent or an adhesive. Additive manufacturing methods are in some instances also referred to as 3D printing methods, A de Laval nozzle is understood to be a nozzle in which the cross section in the flow direction of the nozzle is first constricted and then widens again up to the gas exit. A carrier gas flow is understood to be a flow of a carrier gas. The carrier gas is present so as to be gaseous. A cooling medium flow is understood to be a flow of a cooling medium. The cooling medium herein can be present so as to be liquid, gaseous, and/or solid. Said cooling medium can change the aggregate state thereof when exiting the cooling medium nozzle such that a liquid cooling medium after exiting the cooling medium nozzle is present so as to be at least partially gaseous and/or solid. The cooling medium nozzle can in principle be any nozzle; this can in particular also be the exit of a tube.

The carrier gas flow is initially accelerated by the de Laval nozzle. Simultaneous mixing of the carrier gas flow and the cooling medium flow in the de Laval nozzle then takes places when the exiting of the cooling medium flow into the carrier gas flow takes place within the de Laval nozzle. This results in a distribution of the cooling medium in the carrier gas flow. To the extent that the cooling medium nozzle is positioned such that the exiting of the cooling medium flow takes place downstream of the de Laval nozzle, the mixing of the cooling medium and the carrier gas takes place in the carrier gas flow generated by the de Laval nozzle. A fundamentally turbulent or quasi-turbulent flow is generated by the acceleration imparted to the carrier gas in the de Laval nozzle, the cooling medium being introduced into said flow. Positive mixing of the cooling medium and the carrier gas thus takes place.

The cooling gas flow is directed at least onto the region to be solidified. Preferable herein is tracking of the nozzle such that said nozzle is always directed onto the region to be solidified, or the cooling of entire regions or even of the entire region provided for the construction of the component. It has surprisingly been demonstrated that the cooling gas flow does not have any negative effects on the additive manufacturing method, in particular that no displacement or similar of the base material arises, but rather that a defined and rapid solidification of the base material takes place such that more clearly defined edges of the component and rapid cycle times are enabled.

According to one advantageous design embodiment of the method, the cooling medium nozzle in the direction of a longitudinal axis of the de Laval nozzle is displaceable relative to the de Laval nozzle, Alternatively or additionally, the cooling medium nozzle is designed so as to be replaceable. On account thereof, cooling medium nozzles having dissimilar cross sections that can be passed through by a flow can be predefined so as to be replaceable for different application ranges.

On account of the choice according to the invention of the position of the cooling medium nozzle relative to the de Laval nozzle, in particular on account of the preferred displaceability of the cooling medium nozzle relative to the de Laval nozzle, the composition, in particular with a view to the distribution of the aggregate states of the cooling medium, thus to which proportion of the cooling medium is present in the liquid state, which proportion is present in the solid state, and which proportion is present as a gas, the spatial distribution of the cooling medium in the carrier gas flow, and/or the particle size, in particular the droplet or grain size, of the liquid or solid state can be predefined or set. Setting of the size distribution of the carbon dioxide snow, on the one hand, and the spatial distribution of the carbon dioxide snow particles in the carrier gas flow, can be achieved in particular when carbon dioxide is used as the cooling medium. When a primarily liquid cooling medium such as, for example, liquid nitrogen or liquid argon, is used as the cooling medium, this leads to the setting capability of the distribution of the droplet size of the nitrogen or of the argon, respectively, in the carrier gas flow.

The setting of a distribution of the particle size and/or a spatial distribution of the cooling medium in the carrier gas flow so as to be adapted to the requirements of cooling to be met in each case, and thus to the respective additive manufacturing method used, is possible on account of the efficient atomization of the cooling medium in the carrier gas flow by way of the choice of the position of the cooling medium nozzle relative to the de Laval nozzle, or by way of the preferable displaceability of the cooling medium nozzle relative to the de Laval nozzle.

According to one advantageous design embodiment of the method according to the invention, the cooling medium when flowing through the cooling medium nozzle is present in the liquid aggregate state.

In particular when the cooling medium nozzle is fed carbon dioxide in liquid form as the cooling medium, it can arise that the cooling medium upon exiting the cooling medium nozzle is at least partially formed in the solid aggregate state, for example as carbon dioxide snow, or the carbon dioxide partially evaporates. When using liquid nitrogen and/or argon, the nitrogen and/or the argon typically evaporate/evaporates at least in part.

The use of a fundamentally liquid cooling medium has proven advantageous since the evaporation enthalpy can thus also be utilized for cooling. The same applies to the carbon dioxide snow which is potentially formed at least in part and in the case of which the sublimation cooling energy can be used for cooling the regions to be solidified.

According to one further advantageous design embodiment of the method according to the invention, the cooling medium comprises at least one of the following substances:
  carbon dioxide ($CO_2$);
  nitrogen ($N_2$); and
  argon (AO.

The use of carbon dioxide as the cooling medium has proven particularly advantageous since, on account of carbon dioxide snow being formed, a positive distribution of the cooling medium on the component surface and thus effective cooling can take place and the sublimation cooling energy can be utilized for cooling the component surface. When using liquid nitrogen or argon, the evaporation enthalpy can advantageously be used for the further cooling of the component surface. Nitrogen and argon are inert gases which can be used for suppressing reactions with the component surface in the application and solidification, and which can in particular be utilized for suppressing oxidation reactions.

According to one further advantageous design embodiment of the method according to the invention, the carrier gas comprises at least one of the following gases:
  air;
  argon;
  nitrogen; and
  carbon dioxide.

In order for an ideally simple method management to be enabled, it is preferable for identical gases to be used as the carrier gas and the cooling medium, wherein the gas as the cooling medium in this instance is preferably at least in part used in another aggregate state. The use of air as the carrier gas has proven particularly cost-effective.

Ice can be formed on the cooling medium nozzle in particular in the case of air being used as the carrier gas and in general when the carrier gas has a specific humidity. This can preferably be counteracted in that the cooling medium nozzle is provided with thermal insulation, for example in that a coating from a plastics material, in particular from polytetrafluoroethylene, is configured.

According to one further advantageous design embodiment of the method according to the invention, the carrier gas flow is guided through a porous body before the cooling medium flow is added.

The use of a sintered material such as, for example, a sintered metal or a sintered ceramic, is particularly preferable for configuring the porous body herein. Guiding the carrier gas flow through a porous body leads to a homogenization of the flow downstream of the porous body. The porous body can advantageously be simultaneously used for mechanically mounting and/or centering the cooling medium nozzle in the de Laval nozzle.

According to one further advantageous design embodiment of the method according to the invention, the cooling medium nozzle is configured so as to be centered relative to the de Laval nozzle. In particular when the de Laval nozzle has an axis of symmetry in the form of the longitudinal axis, thus is configured so as to be rotationally symmetrical about the longitudinal axis, it is advantageous for the cooling medium nozzle to be centered relative to the de Laval nozzle, thus for said cooling medium nozzle to be configured on the longitudinal axis of the de Laval nozzle. It can be achieved on account thereof that the cooling medium flow is added in the region of the maximum flow velocity of the carrier gas flow, this leading to a particularly positive distribution of the cooling medium in the carrier gas.

According to one further advantageous design embodiment of the method according to the invention, the cooling medium flow is introduced in the direction of the longitudinal axis of the de Laval nozzle.

It has been demonstrated that adding the cooling medium flow in the direction of the longitudinal axis leads to a particularly homogeneous distribution of the cooling medium in the carrier gas. However, in certain cases it can also be advantageous for the cooling medium flow to instead be added at an angle in relation to the longitudinal axis, in particular when highly asymmetrical components have to be impinged with a cooling gas flow. This can be achieved, for example, in that the cooling medium nozzle is indeed supplied with cooling medium through a cooling medium infeed line that is configured in the direction of the longitudinal axis of the nozzle, but the cooling medium nozzle has an outlet opening which effects a cooling medium flow in a direction that is different from the longitudinal axis.

According to one advantageous design embodiment, the cooling medium nozzle is configured so as to be coaxial with the de Laval nozzle.

Coaxial is understood to mean that one axis of the cooling medium nozzle is identical to a corresponding axis of the de Laval nozzle. The cooling medium nozzle is in particular configured such that said cooling medium nozzle has an outlet opening which points in the direction of the exit side and is configured so as to be symmetrical about the longitudinal axis of the de Laval nozzle.

The displaceability in the direction of the longitudinal axis in terms of construction can be achieved in a simple manner on account of the coaxial configuration of the de Laval nozzle and the cooling medium nozzle. A substantially symmetrical spatial distribution of the cooling medium in the carrier gas flow can be achieved on account of an outlet opening that is symmetrical in relation to the longitudinal axis.

According to one further advantageous design embodiment, the cooling medium nozzle comprises a tube, preferably having an internal diameter of less than 1.5 mm, preferably less than 1.0 mm, particularly preferably less than 0.5 mm.

A capillary which enables the cooling medium to be infed in sufficiently small and economically sensible volumetric flows is preferably used as the cooling medium nozzle or for infeeding the cooling medium to the cooling medium nozzle. The internal diameter of the capillary, or of the tube, respectively, can be adapted as a function of the required cooling and the other parameters such as the prevailing cooling medium pressure, so as to achieve ideally efficient cooling.

In principle, the present invention in the case of a displaceable cooling medium nozzle permits distributions of particle sizes or droplet sizes which are capable of being set, for example particle or droplet diameters of 20 to 40 μm up to 0.2 to 0.3 mm.

According to one further advantageous design embodiment of the device according to the invention, the cooling medium nozzle comprises at least one of the following nozzles:
 a de Laval nozzle;
 a constricted tube; and
 a tube.

A constricted tube is understood to be a tube of which the cross section capable of being passed through by a flow is reduced at least in a sub-region. In the case of a tube as the cooling medium nozzle, said tube has a substantially consistent cross section that is capable of being passed through by a flow, A tube is advantageously also understood to be a capillary having an internal diameter of 1.5 mm and less. A de Laval nozzle is preferably used when it is necessary to increase the outflow velocity of the cooling medium flow by virtue of the prevailing conditions. A tube, in particular a capillary, is preferably used as the nozzle when only a rather short cooling medium nozzle is required, thus when the cooling medium flow in the flow direction is to be introduced in the front region of the de Laval nozzle. In the case of the constricted tube, the internal diameter capable of being passed through by a flow is preferably decreased by more than 30%, for example from an internal diameter of approximately 0.8 mm to 0.4 mm or 0.5 mm. If the cooling medium nozzle is configured as a de Laval nozzle, the diameter capable of being passed through by a flow therein, from upstream of said de Laval nozzle to the central part of the de Laval nozzle, can be reduced by at least 50%, for example from 0.8 mm to 0.3 mm. An acceleration of the cooling medium flow by virtue of the decreased cross section capable of being passed through by a flow also takes place in the case of a constricted tube as the cooling medium nozzle.

The production of a de Laval nozzle or a constricted tube as the cooling medium nozzle preferably takes place in a manner independent of the present invention by heating and drawing a metal capillary.

According to one further advantageous design embodiment, a porous body is configured between the carrier gas connector and the de Laval nozzle.

Said porous body in operation is passed through by a flow of the carrier gas.

Said porous body is preferably a sintered body such as, in particular, a sintered metal body, or a sintered ceramics body. The carrier gas flow on account of the porous body being passed through by a flow is homogenized such that defined conditions prevail when the carrier gas flows into the de Laval nozzle, so that minor pressure variations and similar in the carrier gas supply are equalized ahead of the porous member.

According to one further advantageous design embodiment, the cooling medium nozzle is centered relative to the de Laval nozzle by a porous body.

A design embodiment in which the cooling medium nozzle is nevertheless still displaceable is chosen herein. The porous body can simultaneously also be utilized for homogenizing the flow of the carrier gas flow.

According to one advantageous design embodiment, the component is produced by at least one of the following methods:
 selective laser melting;
 selective laser sintering;
 binder jet printing;
 electron beam melting;
 molten layering;
 wire arc additive manufacturing method;
 overlay welding;
 contour crafting;
 stereolithography: and
 3D screen printing.

In the case of selective laser melting, the material to be processed in pulverulent form is applied in a thin layer to a base plate or an underlying layer and in regions is then melted by means of laser irradiation such that a firm metal layer results upon solidification. Selective laser sintering is based on a similar procedure, wherein sintering of the powder takes place in regions herein. In binder jet printing, a pulverulent base material is in regions adhesively bonded by way of a binding agent. In electron beam melting, a pulverulent initial material, usually a metallic initial material, is in regions melted by an electron beam and subsequently solidifies. In molten layering, a melt-like initial material, for example a melting-capable plastics material or a metal, is melted layer-by-layer in a punctiform manner and applied to a base plate or an underlying layer. In overlay welding, in particular a wire or a powder, by laser welding or plasma-powder overlay welding is applied in regions to a base plate or an underlying layer. In contour crafting, a viscous material, for example concrete, is applied in regions by way of a nozzle and solidifies by subsequent curing. In the context of stereolithography, a light-curing plastics material in thin layers is in regions cured by a laser. In 3D screen printing, a component is generated by applying a base material layer-by-layer by way of screen printing.

In wire arc additive manufacturing, a wire-shaped material is melted in drops by an arc, for example according to the TIG (tungsten inert gas), MIG (metal inert gas), or MAG (metal active gas) welding method (or other welding methods utilizing an arc) and in the sense of an additive manufacturing method is utilized for manufacturing three-dimensional structures. Using the wire arc additive manufacturing method, the melting rate as well as the component mass generated can be significantly increased in comparison with the powder/laser methods. At the same time, the thermal input into the components produced is significantly increased, this having an influence on the properties of the material or the component, respectively, and being in particular capable of having a negative influence thereon, such that cooling is required here. It is in particular known for the application of material to be interrupted in order for cooling intervals to be provided. It is here that the present invention permits continuous manufacturing without cooling intervals. The cooling according to the present invention moreover permits precise controlling of the workpiece temperature and thus also precise controlling of the material properties in the workpiece.

According to one advantageous design embodiment, the base material by way of at least one application device is at least solidified and optionally also applied, and the application device is moved in a corresponding manner, wherein the at least one cooling gas flow is delivered so as to lead and/or trail the application device.

The solidification and, depending on the method applied, also the application of the base material is carried out herein by means of the application device. The application device herein is moved in the context of the method according to the invention in order to guarantee the layer-by-layer construction of the component. Leading delivery of the cooling gas flow herein means that regions are cooled before the application device carries out the solidification and optionally the application of the base material. A correspondingly trailing delivery of the cooling gas flow means that the cooling gas flow is delivered onto the component or the application location once the application device has carried out the solidification and optionally the application of the base material. A leading and a trailing delivery of two cooling gas flows can preferably take place so as to impart a specific temperature profile, for example. The cooling gas flows can have dissimilar volumetric flows, temperatures, and/or pressures.

According to one advantageous design embodiment, the base material by way of at least one application device is at least solidified and optionally also applied, wherein the at least one cooling gas flow is directed onto the component in a plane other than the plane in which the application device is moved.

The layer-by-layer construction of the component means in particular that the application device is moved in planes in order for the layer-by-layer construction of the component to be guaranteed. One layer after another is configured herein. The orientation of the at least one cooling gas flow toward another plane of the component means in particular that the cooling gas flow is directed onto regions of the component that have already been configured.

According to one advantageous design embodiment, the at least one cooling gas flow is directed onto the component such that a predefinable temperature profile is achieved in the component.

The temperature profile herein can be chosen such that the thermal input and output is influenced in a targeted manner such that repeating contours are created in the component, for example. Alternatively or additionally, the temperature profile can be chosen such that any excessive material stress in the construction of the component is avoided, and in particular hot and/or cold cracks are avoided. Alternatively or additionally, the temperature profile can be chosen such that material properties in the component can be set in a targeted localized manner, for example, that a specific crystalline structure of a steel is achieved, in particular that a component has locally variable hardness and/or toughness values.

BRIEF DESCRIPTION OF THE DRAWINGS

The invention and the associated technical field will be explained in more detail hereunder by means of the figures. It is to be pointed out that the invention is not intended to be limited by the exemplary embodiments shown. In particular, unless explicitly explained otherwise, it is also possible to extract partial aspects of the facts explained in the figures and combine them with other components and/or knowledge from other figures and/or the present description. Schematically.

DETAILED DESCRIPTION OF PREFERRED EMBODIMENTS

Figure 1:
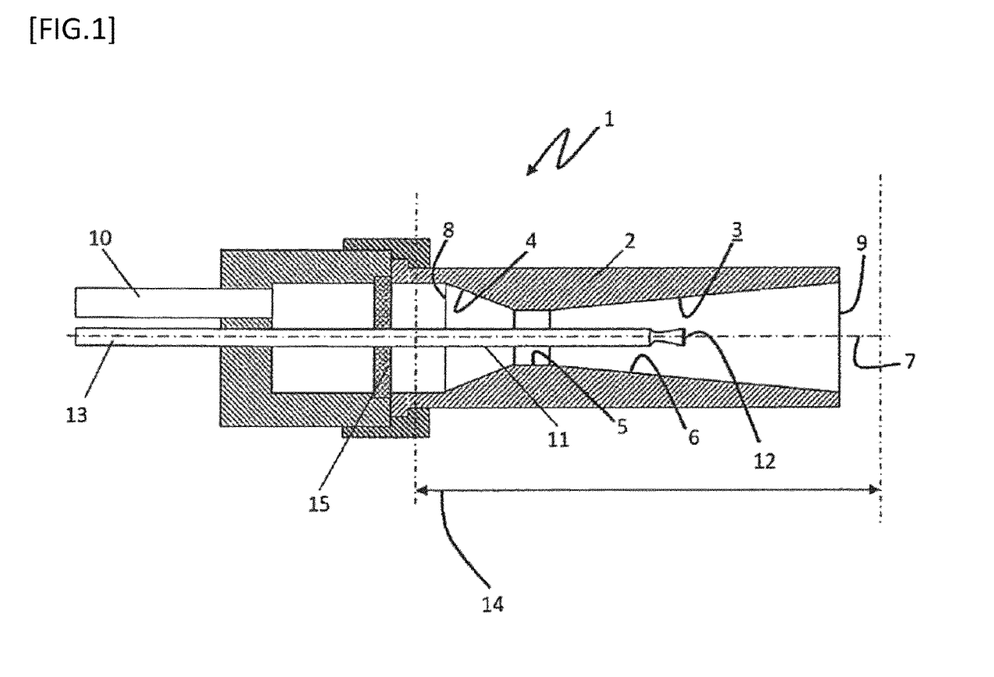
FIG. 1 shows a first example of a device for delivering a cooling gas flow.
Figure 2:
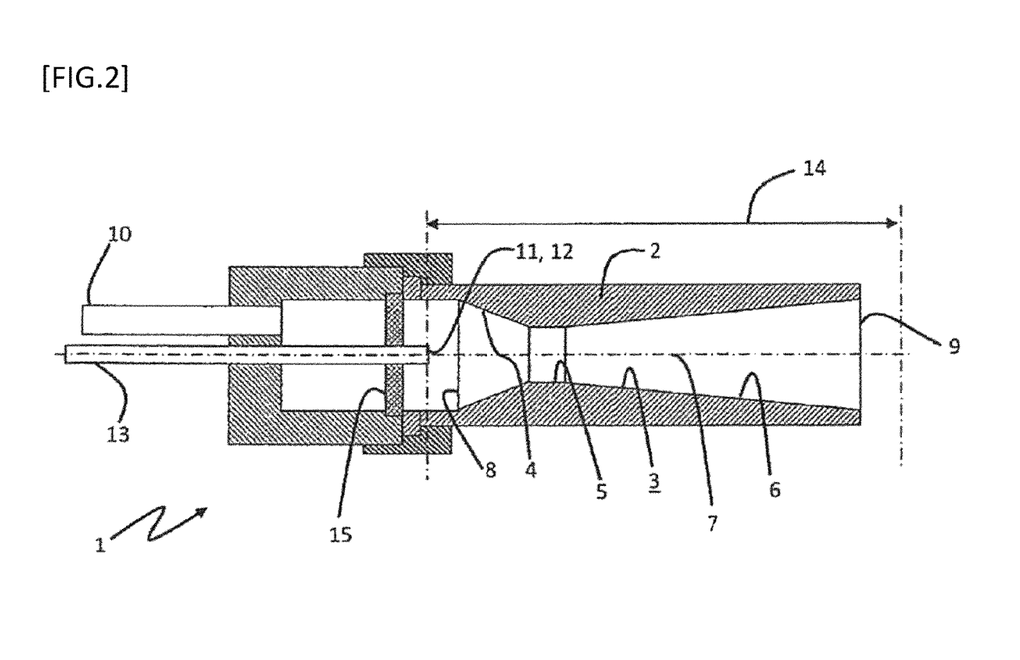
FIG. 2 shows a second example of a device for delivering a cooling gas flow.
Figure 3:
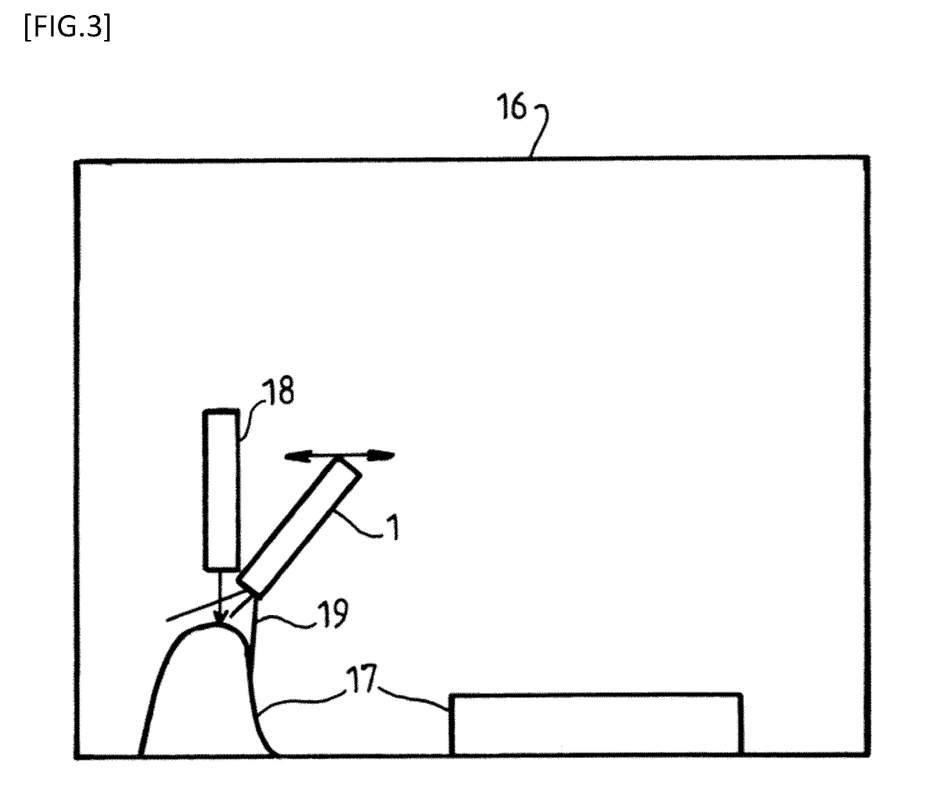
FIG. 3 shows an example of an additive manufacturing method.
Figure 4:
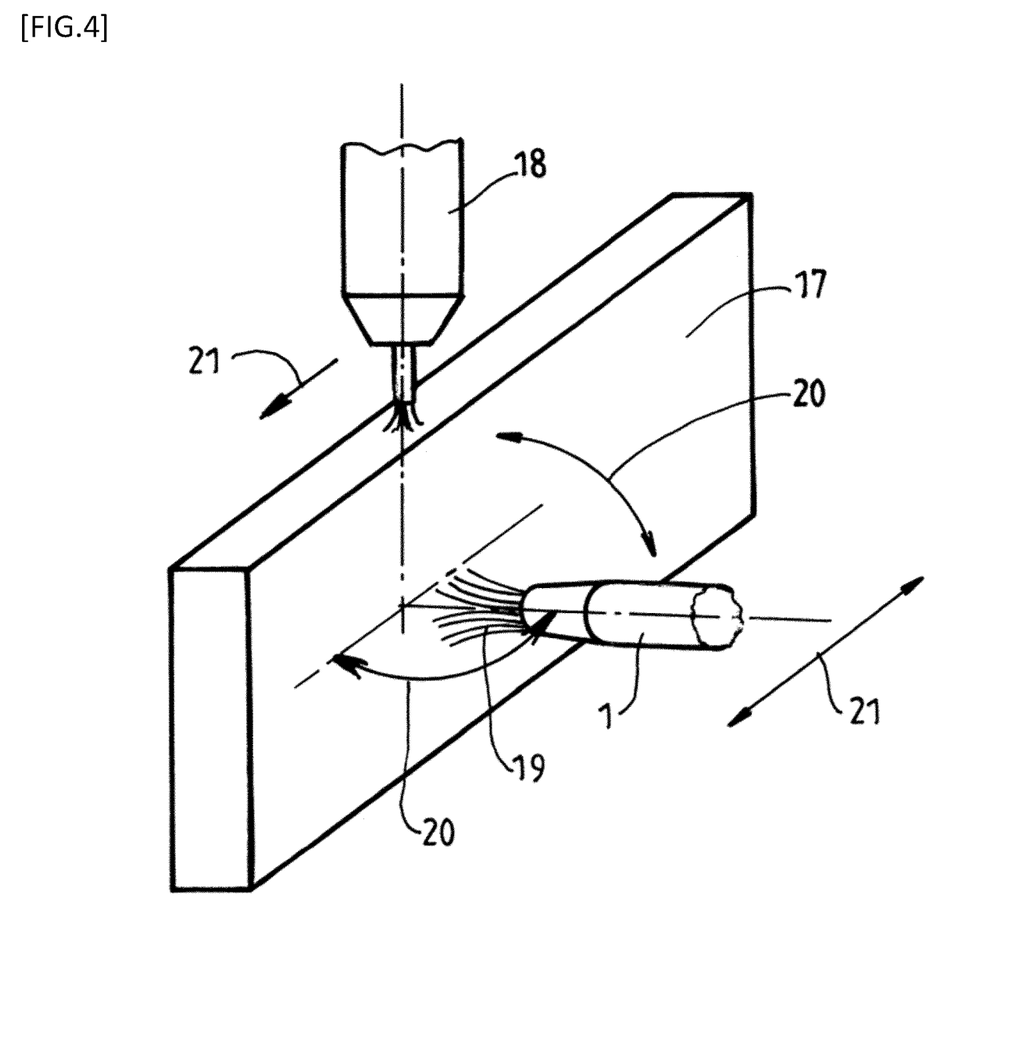
FIG. 4 shows another example of an additive manufacturing method.
Figure 5:
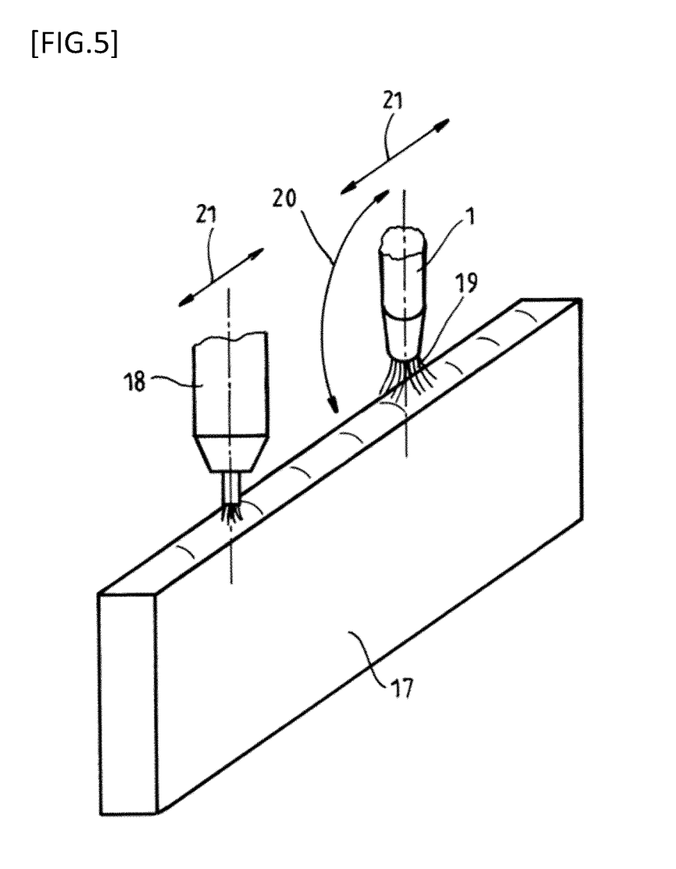
FIG. 5 shows another example of an additive manufacturing method.

FIG. 1 schematically shows a first example of a device 1 for delivering a cooling gas flow. The device 1 comprises a nozzle body 2 having a de Laval nozzle 3. The de Laval nozzle 3 comprises a first region 4 in which the cross section capable of being passed through by a flow decreases, a second region 5 in which the cross section capable of being passed through by a flow is consistent, and a third region 6 in which the cross section capable of being passed through by a flow increases. The de Laval nozzle 3 is configured so as to be rotationally symmetrical in relation to a longitudinal axis 7. The de Laval nozzle 3 has an entry side 8 and an exit side 9. The de Laval nozzle 3 in operation is passed through by a flow from the entry side 8 to the exit side 9.

A carrier gas connector 10 by way of which the device 1 in operation can be supplied with a carrier gas is fluidically connected to the entry side 8 of the de Laval nozzle 3. The device 1 furthermore comprises a cooling medium nozzle 11 having an outlet opening 12 for introducing cooling medium into the carrier gas flow. The cooling medium nozzle 12 is connected to a cooling medium infeed line 13. The cooling medium nozzle 11 in operation by way of the cooling medium infeed line 13 is supplied with cooling medium which is introduced into the carrier gas flow through the outlet opening 12. The cooling medium nozzle 11 herein is disposed so as to be displaceable along the longitudinal axis 7 of the de Laval nozzle 3 such that the cooling medium flow is introduced into the carrier gas flow within the de Laval nozzle 3, or is introduced into the carrier gas flow downstream of the de Laval nozzle 3. This means that the cooling medium nozzle 11 is configured so as to be longitudinally displaceable such that the outlet opening 12 either is positioned within the de Laval nozzle 3 or is positioned behind the exit side 9 of the de Laval nozzle 3. The latter case means that the exit side 9 of the de Laval nozzle 3 lies between the outlet opening 12 of the cooling medium nozzle 11 and the entry side 8 of the de Laval nozzle 3. The cooling medium flow and the carrier gas flow form the cooling gas flow.

FIG. 1 shows a case in which the cooling medium nozzle 11 represents a de Laval nozzle, wherein said cooling medium nozzle lies within the de Laval nozzle 3. In operation, a carrier gas is introduced into the de Laval nozzle 3 through the carrier gas connector 10, wherein the carrier gas flow created is accelerated in the de Laval nozzle 3. The cooling medium as the cooling medium flow is then added through the cooling medium nozzle 11 to the carrier gas flow created. A distribution of the cooling medium and an atomization of the cooling medium in the carrier gas flow takes place on account of the addition to the carrier gas flow, the flow properties of the latter being changed by the de Laval nozzle 3. Depending on the position of the outlet opening 12 of the cooling medium nozzle 11 in the de Laval nozzle 3 or downstream of the de Laval nozzle 3, other distributions of particle sizes of the cooling medium in the carrier gas flow and other spatial distributions of the cooling medium in the carrier gas flow are achieved.

The displacement range in which the outlet opening 12 of the cooling medium nozzle 11 can move is identified by the reference sign 14. A design embodiment in which the range by which the cooling medium nozzle 11 can exit from the de Laval nozzle 3 in the direction of the longitudinal axis 7 is smaller than one fifth, preferably even less than one tenth, of the length of the displacement range 14 is preferable.

The first exemplary embodiment of the device 1 according to the invention furthermore comprises a porous body 15. Said porous body 15 is configured as a sintered metal disc and centers the cooling medium nozzle 11, or the cooling medium infeed line 13, respectively, in the interior of the de Laval nozzle 3. The carrier gas in operation is forced through the porous body 15, this leading to a homogenization of the carrier gas flow. Pressure and velocity variations of the carrier gas can thus be attenuated prior to entering the de Laval nozzle 3 such that uniform conditions prevail in operation at all times.

FIG. 2 schematically shows a second example of a device 1 for delivering a cooling gas flow. For reasons of clarity, only the points of differentiation in relation to the first example are to be described here. Reference otherwise is made to the description pertaining to the first example. A different cooling medium nozzle 11 is configured in the second example. The cooling medium nozzle 11 in this case is configured as a capillary which also represents the cooling medium infeed line 13. The cooling medium such as, for example, carbon dioxide from the cooling medium infeed line 13 exits only through the outlet opening 12 of the cooling medium nozzle 11 and is then atomized and distributed in the carrier gas flow.

FIG. 3 very schematically shows a device 16 for the additive manufacturing of a component 17. Said device 16 has an application device 18 which constructs the component 17 by solidifying region-by-region a base material. The application device herein can be configured according to an additive manufacturing method described here. The region of the component 17 that is to be solidified is particularly cooled by the device 1 for delivering a cooling gas flow 19. The device 1 for delivering a cooling gas flow 19 is configured so as to be movable, as is indicated by the arrows. The movement can take place not only in the direction of the arrows but additionally in particular in a direction perpendicular to the direction of the arrows. A pivoting movement of the device 1 is also possible according to the invention. Furthermore, the movement of the device 1 for delivering a cooling gas flow 19 can be coupled to the movement of the application device 18. It is also possible for the entire face of the device 16 for the additive manufacturing of a component 17 to be impinged with the cooling gas flow 19.

FIG. 4 shows a further example in which a component 17 is configured layer-by-layer by way of an application device 18. The cooling gas flow 19 here by way of a device 1 for delivering a cooling gas flow 19 is directed onto the component 17 in a plane other than the plane in which the application device 18 is moved. In particular, the cooling gas flow 19 here is directed onto the part of the component 17 that has already been generated, thus from bottom to top below the application device 18 in the construction of a component 17. The device 1 for delivering a cooling gas flow 19 herein is capable of being inclined, preferably about two axes, as is symbolized by the inclinations 20 plotted as arrows. The device 1 for delivering a cooling gas flow 19 herein is movable (displaceable) in the moving direction 21.

FIG. 5 shows an example in which the application device 18 and the device 1 for delivering a cooling gas flow 19 are moved in the same plane; the cooling gas flow 19 herein can be moved so as to lead and/or trail the application device 18 in the moving direction 21. The device 1 for delivering a cooling gas flow 19 herein is capable of being inclined, as is symbolized by the inclination 20 plotted as an arrow.

On account of the movement in the same plane or different planes, of the inclinations 20, and the movement in the moving directions 21, the component 17 can be imparted a temperature profile which is adapted to the material and/or to the desired properties of the component 17. In particular, local hardness and/or toughness values in the component 17 can thus be achieved, and manufacturing without hot and/or cold cracks can be achieved.

LIST OF REFERENCE SIGNS

1 Device for delivering a cooling gas flow
2 Nozzle body
3 De Laval nozzle
4 First region
5 Second region
6 Third region
7 Longitudinal axis
8 Entry side
9 Exit side
10 Carrier gas connector
11 Cooling medium nozzle
12 Outlet opening
13 Cooling medium infeed line
14 Displacement range
15 Porous body
16 Device for additive manufacturing
17 Component
18 Application device
19 Cooling gas flow
20 Inclination
21 Moving direction It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A method for the additive manufacturing of a component, wherein the component is configured layer-by-layer from a base material which is solidified at
   nitrogen ($N_2$); or
   argon (Ar).

2. The method according to claim 1, wherein the de Laval nozzle has a longitudinal axis and the cooling medium nozzle in the direction of the longitudinal axis of the de Laval nozzle is displaceable relative to the de Laval nozzle.

3. The method according to claim 1, wherein the cooling medium when flowing through the cooling medium nozzle is present in a liquid aggregate state.

4. The method according to claim 1, wherein the cooling medium comprises at least one of the following substances:
   carbon dioxide ($CO_2$).

5. Method according to one of the preceding claims, wherein the carrier gas comprises at least one of the following gases:
   air;
   argon;
   nitrogen; and
   carbon dioxide.

6. The method according to claim 1, wherein the carrier gas flow is guided through a porous body before the cooling medium flow is added.

7. The method according to claim 1, wherein the cooling medium nozzle is configured so as to be centered relative to the de Laval nozzle.

8. The method according to claim 1, wherein the de Laval nozzle has a longitudinal axis and the cooling medium flow is introduced in the direction of the longitudinal axis of the de Laval nozzle, least in regions in each layer, comprising introducing at least one cooling medium flow by way of at least one cooling medium nozzle into a carrier gas flow so as to form a cooling media flow for cooling at least the region to be solidified, wherein the cooling medium is present so as to be liquid and/or gaseous, wherein the cooling media flow is guided through a de Laval nozzle, wherein the cooling medium flow is introduced such that the outflow of the cooling medium flow into the carrier gas flow takes place within or downstream of the de Laval nozzle, and the cooling media flow is directed onto the component;

wherein the component is produced by at least one of the following methods: selective laser melting; selective laser sintering; binder jet printing; electron beam melting; molten layering; wire arc additive manufacturing method; overlay welding; contour crafting; stereolithography; light exposure methods; or 3D screen printing.

9. The method according to claim 1, wherein the at least one cooling media flow is directed onto the component such that a predefinable temperature profile is achieved in the component.

10. The method according to claim 9, wherein the temperature profile is chosen such that hot and cold cracks are avoided.

11. The method according to claim 9, wherein the temperature profile is chosen such that material properties in the component can be set in a localized manner.

* * * * *